United States Patent
Koide (10) Patent No.: US 7,588,337 B2
(45) Date of Patent: Sep. 15, 2009

(54) OPTICAL SYSTEM AND IMAGE PROJECTION APPARATUS

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 11/371,041

(22) Filed: Mar. 7, 2006

(65) Prior Publication Data

US 2006/0215247 A1     Sep. 28, 2006

(30) Foreign Application Priority Data

Mar. 11, 2005   (JP)   ............................. 2005-068895

(51) Int. Cl.
   *G03B 21/14*   (2006.01)
(52) U.S. Cl. .......................................... 353/38; 353/97
(58) Field of Classification Search .................. 353/38, 353/97; 362/257–311, 317–361; 349/5–9
   See application file for complete search history.

(56) References Cited

U.S. PATENT DOCUMENTS

| 5,519,518 | A | 5/1996 | Watanabe et al. |
| 6,497,488 | B1 * | 12/2002 | Yamauchi et al. ............. 353/38 |
| 6,769,777 | B1 * | 8/2004 | Dubin et al. ................... 353/97 |
| 7,232,223 | B2 * | 6/2007 | Koide ........................... 353/20 |
| 7,241,027 | B2 * | 7/2007 | Cho et al. ..................... 362/268 |
| 2003/0021579 | A1 | 1/2003 | Shinoda |
| 2004/0080722 | A1 | 4/2004 | Yamasaki et al. |
| 2004/0174595 | A1 | 9/2004 | Koide |

FOREIGN PATENT DOCUMENTS

| JP | 2004-151674 | 5/2004 |
| JP | 2004-245977 | 9/2004 |
| JP | 3111806 | 6/2005 |

OTHER PUBLICATIONS

European Patent Office, Search report and search opinion dated Jun. 8, 2006.

* cited by examiner

*Primary Examiner*—William C. Dowling
(74) *Attorney, Agent, or Firm*—Morgan & Finnegan LLP (57) ABSTRACT

An optical system is disclosed which is capable of improving of its contrast characteristic and displaying of images which have a brightness according to the brightness of the use environment. The optical system comprises an optical integrator which divides and recombines the illumination luminous flux in a first axis direction and a light intensity distribution converter which converts the light intensity distribution of the illumination luminous flux in a second axis direction. The optical system further comprises a luminous flux limiting unit which has an aperture. The size of the aperture is changeable in the second axis direction and unchangeable in the first axis direction.

27 Claims, 6 Drawing Sheets

OPTICAL SYSTEM AND IMAGE PROJECTION APPARATUS

FIELD OF THE INVENTION

The present invention relates to an optical system used in an image projection apparatus such as a projector, specifically to an optical system which illuminates an image-forming element such as a liquid crystal display element using light from a light source, and enlarges and projects an original image formed on the image-forming element onto a screen or the like.

BACKGROUND OF THE INVENTION

In projectors which use an image-forming element such as a liquid crystal panel, it is important to use light from a light source efficiently, reduce unevenness of illuminance on a screen, and display images having a high contrast. Many methods to improve them have been proposed in the past.

For example, an optical integrator has been known which is constituted by two lens array, each having lens cells arranged two-dimensionally. In this optical integrator, a first lens array divides a luminous flux from a light source into a plurality of luminous fluxes, and a second lens array performs an image formation on the display area of the liquid crystal panel with enlargement and superposition of the plurality of luminous fluxes, thereby obtaining illumination light with a high evenness (see Japanese Patent Laid-Open No. H03-111806).

Further, a method has been proposed for achieving evenness of illumination by a substantially parallel light beam transmission in a first direction and an optical integration in a second direction orthogonal to the first direction (see Japanese Patent Laid-Open No. 2004-245977 and No. 2004-271887). The first direction is a direction in which deterioration of contrast occurs due to an incident angle dependency of color separating or combining elements used in projectors, the elements including deflection elements such as a dichroic mirror, polarization beam splitting elements such as a polarization beam splitter, and that of liquid crystal panels.

On the other hand, projectors require not only displaying of bright images but also preventing of observer's feeling of glare by not displaying too-bright images in a bright environment. In other words, the projectors require a function to suppress the brightness of displayed images in accordance with the brightness of the use environment while maintaining a high contrast characteristic or improving those contrast characteristic.

For achieving this required function, a method has been proposed in Japanese Patent Laid-Open No. 2004-151674 which suppresses the brightness of displayed images by using an optical integrator that includes two lens array, each having lens cells arranged two-dimensionally, and means for variably shielding the illumination luminous flux while improving the contrast characteristic.

However, a problem occurs when the means for variably shielding the illumination luminous flux, which has been proposed in Japanese Patent Laid-Open No. 2004-151674, is simply used in the illumination optical system that controls separately in the two-dimensional axis directions the optical integrator and the light intensity distribution converting means for converting the light intensity distribution, which has been described in Japanese Patent Laid-Open No. 2004-245977 and No. 2004-271887.

Specifically, since the illumination optical system is a system that adopts different illumination light transmission methods in the two directions, there is a possibility that a balance of even illumination of liquid crystal panels may disrupt and the evenness of the displayed image may be not maintained.

BRIEF SUMMARY OF THE INVENTION

An object of the present invention is to provide an optical system including an optical integrator and a light intensity distribution converter, the optical system being capable of improving of its contrast characteristic and displaying of images which have a brightness according to the brightness of the use environment, without deteriorating evenness of image's brightness.

According to an aspect, the present invention provide an optical system which introduces an illumination luminous flux from a light source to an image-forming element and projects an luminous flux from the image-forming element onto a projection surface. The optical system comprises: an optical integrator which divides and recombines the illumination luminous flux in a first axis direction in a two-dimensional section that is orthogonal to a travelling direction of the illumination luminous flux; and a light intensity distribution converter which has a function to convert the light intensity distribution of the illumination luminous flux in a second axis direction, which is orthogonal to the first axis direction, in the two-dimensional section. The optical system further comprises a luminous flux limiting unit which has an aperture. The size of the aperture is changeable in the second axis direction and unchangeable in the first axis direction.

According to another aspect, the present invention provides an optical system which introduces an illumination luminous flux from a light source to an image-forming element. The optical system comprises: an optical integrator which divides and recombines the illumination luminous flux in a first axis direction in a two-dimensional section that is orthogonal to a travelling direction of the illumination luminous flux; and a light intensity distribution converter which has a function to convert the light intensity distribution of the illumination luminous flux in a second axis direction, which is orthogonal to the first axis direction, in the two-dimensional section. The optical system further comprises a luminous flux limiting unit which has an aperture. The size of the aperture is changeable in the second axis direction and unchangeable in the first axis direction.

According to yet another aspect, the present invention provides an optical system which introduces an illumination luminous flux from a light source to an image-forming element and projects an luminous flux from the image-forming element onto a projection surface. The optical system comprised: an optical integrator which divides and recombines the illumination luminous flux in a first axis direction in a two-dimensional section that is orthogonal to a travelling direction of the illumination luminous flux; and a light intensity distribution converter which has at least a function to convert the light intensity distribution of the illumination luminous flux in a second axis direction, which is orthogonal to the first axis direction, in the two-dimensional section. The optical system further comprises a luminous flux limiting unit which has an aperture. The luminous flux limiting unit has a part where the width of the aperture in the second axis direction becomes larger as the distance from an optical axis of the optical system increases in the first axis direction.

The present invention also provides an image projection apparatus having one of the above-described optical systems and an image-forming element, and further an image displaying system constituted by the image projection optical system and an image supplying apparatus.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Embodiment 1

Figure 1:
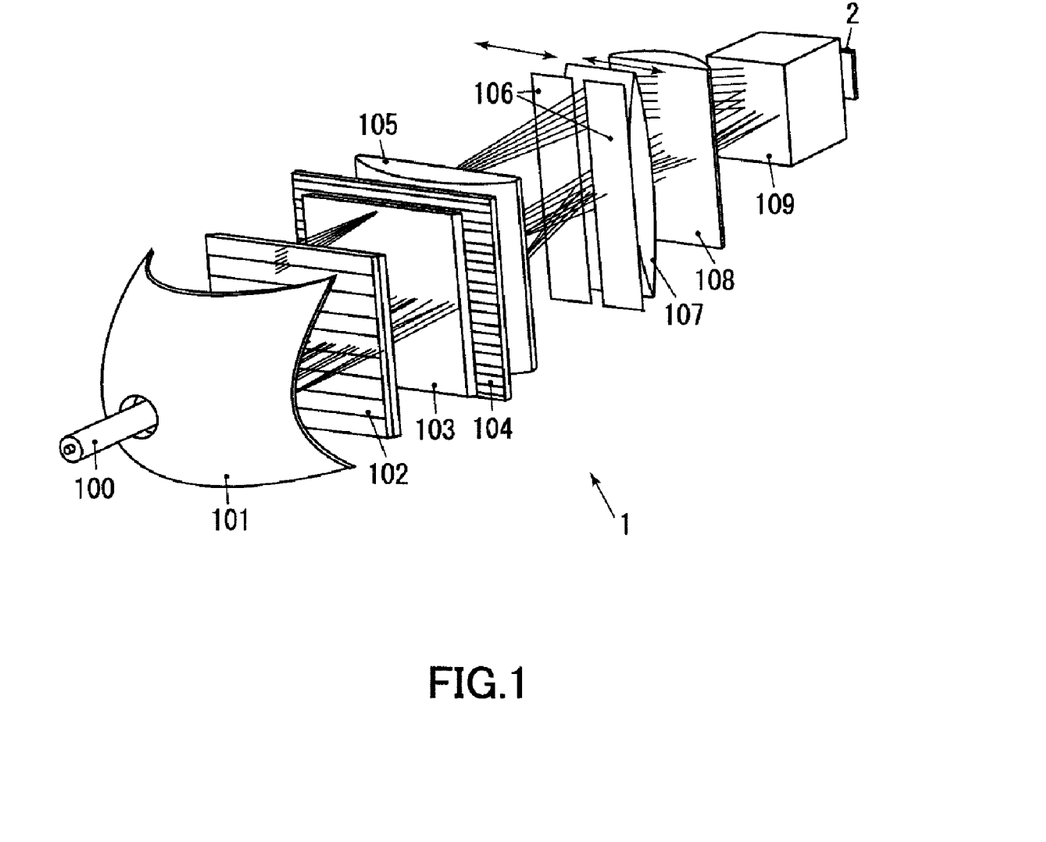
FIG. 1 is a perspective view showing the structure of an illumination optical system of a liquid crystal projector, which is Embodiment 1 of the present invention.
Figure 2:
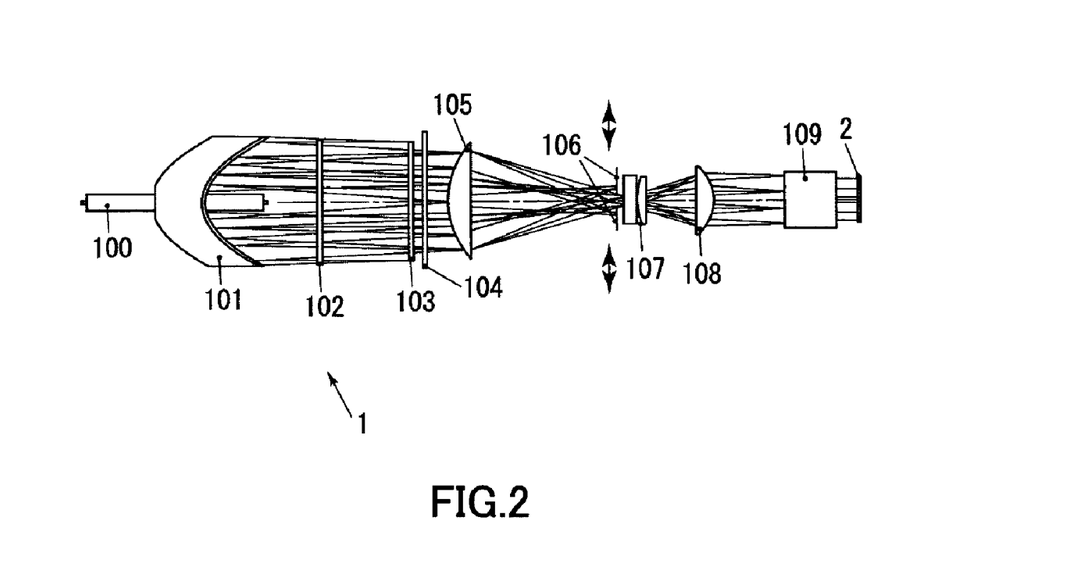
FIG. 2 is a top sectional view of the illumination optical system of Embodiment 1.
Figure 3:
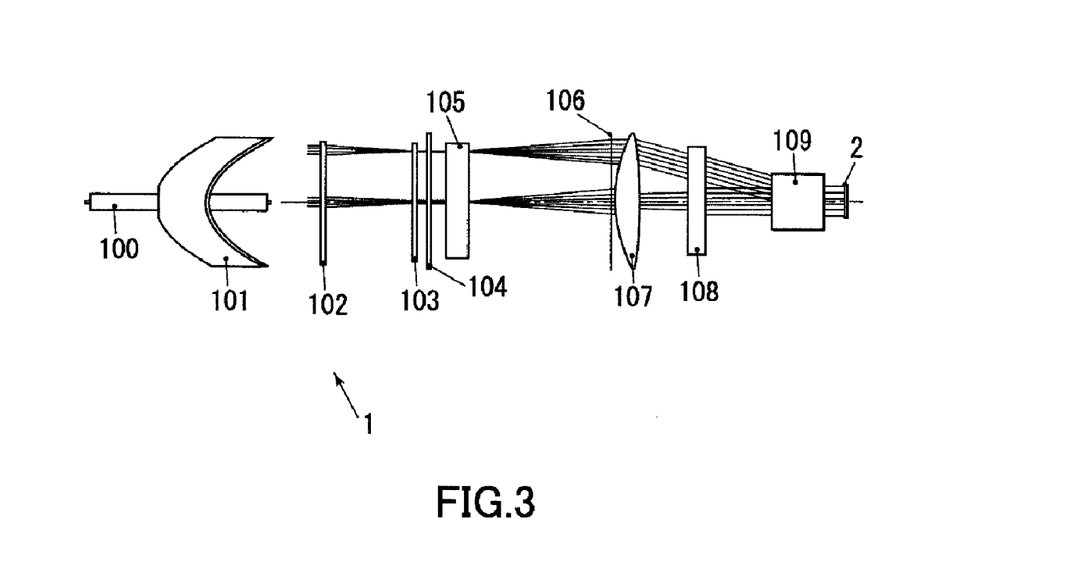
FIG. 3 is a side sectional view of the illumination optical system of Embodiment 1.

FIGS. 1 to 3 show the structure of an illumination optical system that is Embodiment 1 of the present invention. FIG. 1 is a perspective view showing the main structure of the illumination optical system, FIG. 2 is a top sectional view thereof. FIG. 3 is a side sectional view of the illumination optical system.

In these figures, 1 denotes the illumination optical system. 100 denotes a discharge gas excitation light-emitting lamp as a light source, such as a super high pressure mercury lamp, a metal haloid lamp, or a xenon lamp. The discharge gas excitation light-emitting lamp hereinafter is referred to simply as a light source lamp. A luminous flux emitted from the light source lamp 100 is parallelized by being reflected by a parabolic reflecting mirror 101, and the luminous flux thereby becomes a substantially parallel visible light beam.

However, the actual light source has a light emission distribution with a finite size (or the light emission area of the light source has a finite size). Therefore, this embodiment uses a near-point light source made by limiting the electron excitation area of the gas and narrowing the discharge gap for obtaining a high-quality collimated luminous flux (substantially parallel luminous flux) having a small divergence (divergent angle) possible. In other words, the light emission area of the light source lamp is made as small as possible. Further, this embodiment adopts a direct current type lamp capable of generating of a high-intensity point light source on the negative electrode side by direct current application to the discharge gap. This is to prevent the size of the substantial light emission area from increasing (or, to reduce the size of the light emission area). The increase of the size of the light emission area is caused by a formation of light emission areas on both the positive and negative electrode sides, resulting from bidirectional emission of electrons from the electrodes, which is generated by alternative current application to the discharge gap.

The substantially parallel luminous flux emitted from the lamp unit constituted by the light source lamp 100 and the parabolic reflecting mirror 101 enters a first cylindrical array homogenizer 102. The light incident surface of the first cylindrical array homogenizer 102 is coated with a UV reflective film which cuts ultraviolet light out of visible light range. The ultraviolet light may excite or deteriorate an optical thin film and an optical glass which is a material for lenses, and degrade or transform a liquid crystal polymer which is an organic material used in a liquid crystal display element as an image-forming element or a light modulator. The UV reflective film is provided to prevent the excitation or deterioration of the optical thin film and optical glass and the degradation or transformation of the liquid crystal polymer.

The first cylindrical array homogenizer 102 has a refractive power only in the vertical direction in FIGS. 1 and 3 (or the first axis direction; it hereinafter is referred to as simply the vertical direction). The horizontal direction in FIG. 1 and 2 is called the second axis direction or simply the horizontal direction.

The luminous flux entering the first cylindrical array homogenizer 102 is divided into luminous fluxes of the number of cylindrical lens cells thereof. Each of the divided luminous fluxes is condensed at the focal line position of each cylindrical lens cell, and then reconverted into a substantially parallel luminous flux having a predetermined width by a cylindrical condenser lens 107. The focal line position herein is a position at which the parallel luminous flux that entered the cylindrical lens cell of the first cylindrical array homogenizer 102 is condensed in a plane including the line along the arrangement direction of the cylindrical lens cells and the normal lines of the optical surfaces of the cylindrical lens cells. The cylindrical lens cell forms not a focal point but a focal line. The focal line corresponds to a focal point of a normal lens.

It should be noted that the substantially parallel luminous flux in this and after-described embodiments includes not only a completely parallel luminous flux but also an off-parallel luminous flux that can be considered optically as a parallel luminous flux.

The interval between the first cylindrical array homogenizer 102 and the principal plane of the cylindrical condenser lens 107 is set so as to correspond with the sum of the focal length of the first cylindrical array homogenizer 102 and that of the cylindrical condenser lens 107. The cylindrical condenser lens 107 thereby can perform the abovementioned reconversion into the substantially parallel luminous flux. The first cylindrical array homogenizer 102, the cylindrical condenser lens 107 and a second cylindrical array homogenizer Further, the optical axis line of the cylindrical condenser lens 107 is decentered with respect to the optical axis line (or optical axis plane) of each cylindrical lens cell of the first cylindrical array homogenizer 102. Therefore, the luminous fluxes that passed through the cylindrical lens cells of the first cylindrical array homogenizer 102 are superposed with each other at a position of the exit-side focal line of the cylindrical condenser lens 107. The optical integrating operation (that is, division and recombination of a luminous flux, or division of a luminous flux and superposition of the divided luminous fluxes) thereby is performed.

The optical axis line herein is a line formed by the intersection of the optical axis plane of the cylindrical condenser lens 107 with the optical surface thereof, the optical axis plane being the central plane of the plane symmetrical optical surface of the cylindrical condenser lens 107. The optical axis line can be replaced with the optical axis plane.

With such a configuration, placing an liquid crystal panel 2 at the focal line position can improve the evenness of illuminance on the modulation plane of the liquid crystal panel 2.

The luminous fluxes that passed through the first cylindrical array homogenizer 102 passes through the second cylindrical array homogenizer (or second cylindrical lens array) 103. The focal line position of the first cylindrical array homogenizer 102 is set so as to correspond with the pupil position of the second cylindrical array homogenizer 103. The tandem lens configuration of the second cylindrical array homogenizer 103 and the cylindrical condenser lens 107 gives an optical conjugation relationship to the pupil of each cylindrical lens cell of the first cylindrical array homogenizer 102 and the modulation plane of the liquid crystal panel 2. Thereby, the pupil of each cylindrical lens cell of the first cylindrical array homogenizer 102 is image-formed on the modulation plane of the liquid crystal panel 2 in the vertical direction.

The reason for providing the second cylindrical array homogenizer 103 will be described. The luminous flux emitted from the lamp unit constituted by the light source lamp 100 and the parabolic reflecting mirror 101 does not become an ideal parallel luminous flux and has a divergence (or divergent angle) due to the finite-sized light-emission distribution of the gas excitation light-emission source. The second cylindrical array homogenizer 103 is provided for correcting the divergence (or reducing the divergent angle) of the luminous flux to introduce the luminous flux that passed through the pupil of each cylindrical lens cell of the first cylindrical array homogenizer 102 to the modulation plane of the liquid crystal panel 2 without fail.

The plurality of luminous fluxes that passed through the second cylindrical array homogenizer 103 enters a polarization converting element array 104. The polarization converting element array 104 in which polarization beam splitters are arranged in a multistage configuration converts the light emitted from the lamp unit into polarized light having a predetermined polarization direction, that is, the vertical polarization direction in this embodiment.

P-polarized light (polarized light with the vertical polarization direction) incident on the polarization beam splitting films that are arranged in a multistage configuration passes therethrough. On the other hand, S-polarized light (polarized light with the horizontal polarization direction) incident on the polarization beam splitting film is reflected thereon and then reflected again on the adjacent polarization beam splitting film. The optical path of the S-polarized light thereby is shifted by the pitch of the array. The polarization direction of the S-polarized light is rotated by an angle of 90 degrees by ½-wave plates immediately before emerging from the polarization converting element array 104. The S-polarized light thereby is converted into P-polarized light, and then emerges from the polarization converting element array 104. As described above, the polarization converting element array 104 converts non-polarized light into P-polarized light.

The plurality of luminous fluxes that emerged from the polarization converting element array 104 enters a first cylindrical lens 105. The first cylindrical lens 105 has a refractive power only in the horizontal direction and constitutes a beam compressor (or light-intensity distribution converter) by forming a pair with a second cylindrical lens 108 which is placed ahead of the first cylindrical lens 105 in the travelling direction of the luminous flux. The second cylindrical lens 108 also has a refractive power only in the horizontal direction.

Although the first and second cylindrical lenses 105 and 108 have a refractive power only in the horizontal direction in this embodiment, the present invention is not limited thereto. At least one of the first and second cylindrical lenses 105 and 108 may be a toric lens having a refractive power also in the vertical direction. The luminous fluxes that entered the first cylindrical lens 105 are compressed in the horizontal direction and introduced to the liquid crystal panel 2 in a substantially afocal state. A predetermined amount of pupil distortion aberration intentionally is given to the beam compressor. The pupil distortion aberration controls the luminous flux so that the light-intensity distribution on the modulation plane of the liquid crystal panel 2 may become substantially even.

The luminous flux inside the beam compressor has a characteristic that it does not become an ideal parallel luminous flux because the beam compressor has the above-described pupil distortion aberration and the luminous flux from the lamp unit is emitted from a gas excitation light source having a finite-sized light-emitting distribution.

Especially, in FIG. 2, the luminous flux passing through an aperture of a luminous flux limiting unit 106 which is placed at the common focal line position (or the vicinity thereof) of the first and second cylindrical lenses 105 and 108 that constitute the beam compressor becomes not a linear luminous flux extending in the vertical direction but a luminous flux having a finite width in the horizontal direction. The shape of the aperture forming edges of light-shielding blades constituting the luminous flux limiting unit 106, edges which face the inside of the aperture, will be later-described.

The plurality of luminous fluxes that passed through the first cylindrical lens 105 enter the cylindrical condenser lens 107, and are overlapped with each other in the vertical direction on the modulation plane of the liquid crystal panel 2 that is placed at the focal line position of the cylindrical condenser lens 107. Thereby, the optical integration is performed.

The luminous fluxes that passed through the cylindrical condenser lens 107 enter the second cylindrical lens 108. As described above, the second cylindrical lens 108 has a refractive power only in the horizontal direction and constitutes the beam compressor by forming a pair with the first cylindrical lens 105. This second cylindrical lens 108 compresses the luminous fluxes in the horizontal direction, and the luminous fluxes thereby are introduced to the liquid crystal panel 2 in a substantially afocal state.

Further, the second cylindrical lens 108 is placed so that the pupil position of the first cylindrical lens 105 or the vicinity thereof may have a substantially optical conjugation relationship with the modulation plane of the liquid crystal panel 2. However, since aberration is intentionally given to the beam compressor, the accuracy of the optical conjugation becomes rough. As described above, the pupil of the first cylindrical lens 105 image-forms on the modulation plane of the liquid crystal panel 2 in the horizontal direction.

The reason for providing the second cylindrical lens 108 is the same as that for the second cylindrical array homogenizer 103. In other words, the second cylindrical lens 108 is provided for correcting the divergence of the luminous flux emitted from the lamp unit constituted by the light source lamp 100 and the parabolic reflecting mirror 101 to introduce the luminous flux that passed through the pupil of the first cylindrical lens 105 to the modulation plane of the liquid crystal panel 2 without fail.

The luminous fluxes that passed through the second cylindrical lens 108 enter an optical member 109. A polarization beam splitter having a polarization beam splitting effect can be placed at this optical member's position. In this case, the direction of the polarization beam split is set to the horizontal direction. These are the basic structure of the illumination optical system which introduces the luminous flux from the light source lamp 101 to the liquid crystal panel 2.

Next, the description will be made of the luminous flux limiting unit 106. The luminous flux limiting unit 106 can change the width of a slit-like aperture (hereinafter referred to as a slit aperture) in the horizontal direction by driving its light-shielding members in the direction shown by the arrow in FIGS. 1 and 2. However, the aperture width in the vertical direction is unchangeable from a predetermined open width.

Figure 4:
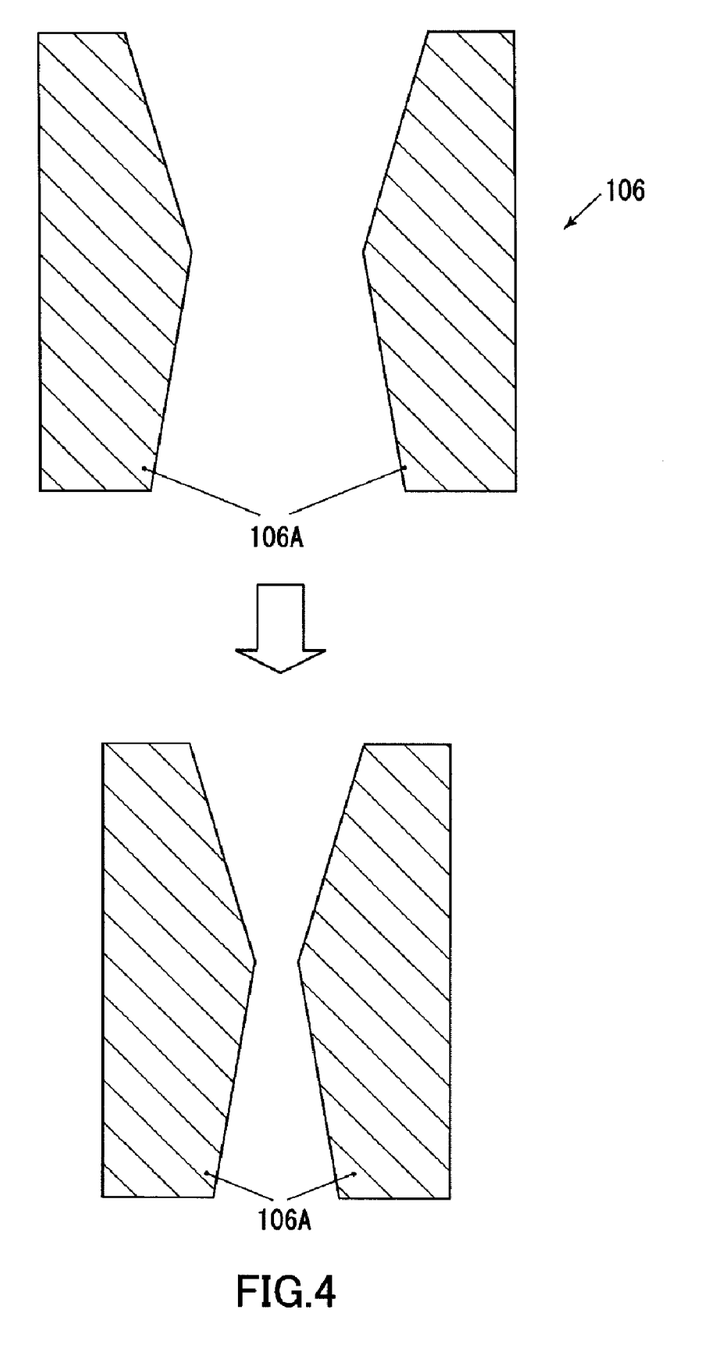
FIGS. 4 and 5 are figures showing the shape of the aperture forming edges of a luminous flux limiting unit used in the illumination optical system of Embodiment 1.
Figure 5:
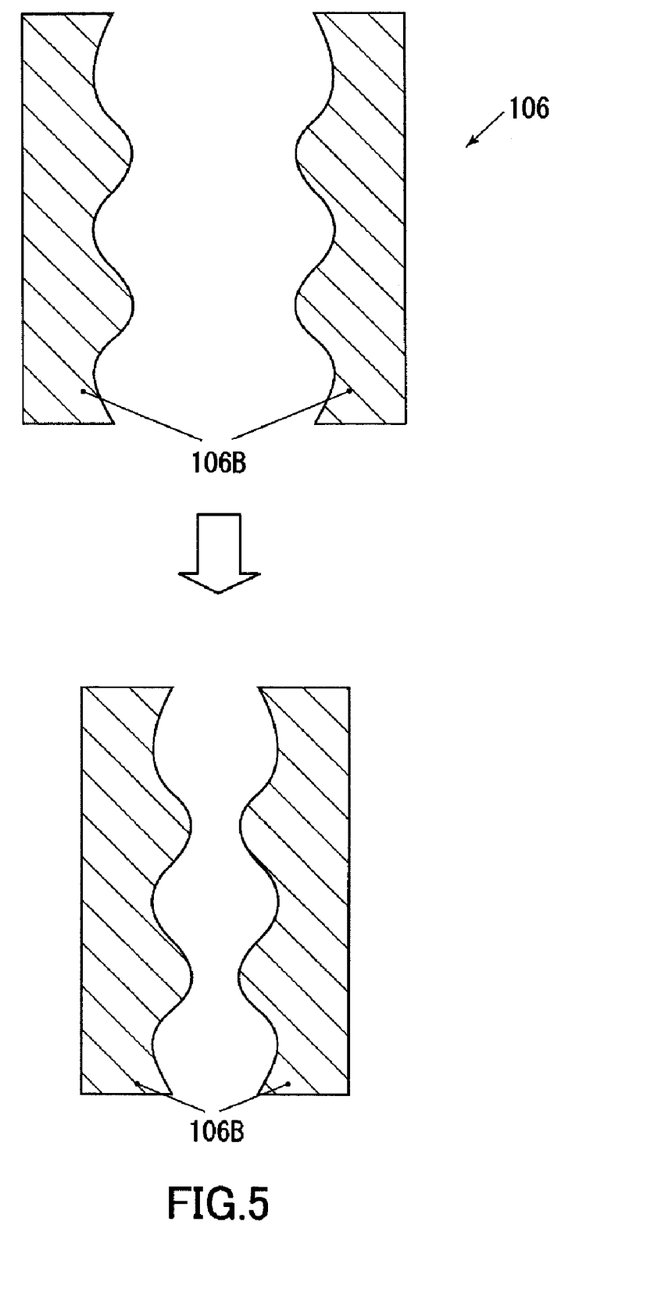

In the vertical direction, this aperture may be opened by not providing the light-shielding member as shown in after-mentioned FIGS. 4 and 5. Moreover, the shape of the aperture may be a flame-like shape (or rectangular opening shape) so as to limit the luminous flux (or passage thereof) in the vertical direction. Furthermore, two light-shielding members may be provided, which are separated from each other in the vertical direction so that their spacing is unchangeable.

Although the shape of the aperture-side edges of the light-shielding members, that is, the shape of slit-aperture forming edges can be a shape of simple parallel straight lines shown in FIG. 1, a non-parallel shape 106A convex towards the inside of the aperture, which is shown in FIG. 4, and a curved shape 106B like a wave shape shown in FIG. 5 are preferable.

This is because the aperture forming edges with the shape of simple parallel straight lines cut the luminous flux linearly, and a partial step of the intensity distribution of the luminous flux, which is introduced to the liquid crystal panel 2, occurs easily.

In contrast, the illumination optical system of this embodiment has an optical integration effect in the vertical direction. Therefore, the integration of the plurality of luminous fluxes whose width in the horizontal direction is controlled before the integration by the luminous flux limiting unit 106, which has the aperture shape (106A an 106B) as shown in FIGS. 4 and 5, prevents the partial step of the intensity distribution of the luminous flux which is introduced to the liquid crystal panel 2.

It should be noted that FIGS. 4 and 5 only show examples of the shape of the aperture forming edges of the luminous flux limiting unit 106, and the shape thereof in the present invention is not limited thereto. A saw teeth shape and a rectangular teeth shape that are formed by a plurality of straight lines can be used. Further, semicircular and semielliptical shapes that are convex towards the inside of the aperture can be used, too.

The luminous flux limiting unit 106 is placed at the common focal line position of the first and second cylindrical lenses 105 and 108 or the vicinity thereof between these lenses 105 and 108, which constitute the beam compressor and each has a positive refractive power, in the traveling direction of the luminous flux in the illumination optical system. At this position, the luminous flux has a finite width in the horizontal direction because the beam compressor has the pupil distortion aberration and the luminous flux from the lamp unit does not become an ideal parallel luminous flux. Therefore, when the slit-aperture width of the luminous flux limiting unit 106 is infinitely narrow, only an exactly parallel luminous flux is emerged from the beam compressor having an afocal characteristic.

In other words, the luminous flux limiting unit 106 in this case has a role similar to a spatial filter which is generally used for extracting collimated light from laser light. Therefore, the luminous flux that introduced to the liquid crystal panel 2 becomes nearer to a parallel luminous flux as the slit-aperture width of the luminous flux limiting unit 106 is set narrower.

On the other hand, liquid crystal panels which are currently produced for enlarged display by projectors include a TN mode operation type and a VAN mode operation type. The liquid crystal panels including the liquid crystal panel 2 in this embodiment have a contrast characteristic which shows the maximum contrast value with respect to the illumination light incident on the modulation plane perpendicularly and lower contrast value as the inclination of the incident illumination light from the perpendicular increases. Therefore, narrowing the slit-aperture width of the luminous flux limiting unit 106 reduces the brightness of displayed images, thereby improving the contrast value.

As to the evenness of the brightness of displayed images, even if the brightness of the display images is changed by the control of the slit-aperture width of the luminous flux limiting unit 106, the evenness thereof can be maintained by shifting the position of the luminous flux limiting unit 106 from the common focal line position of the beam compressor to set the pupil distortion aberration adequately.

Figure 6A:
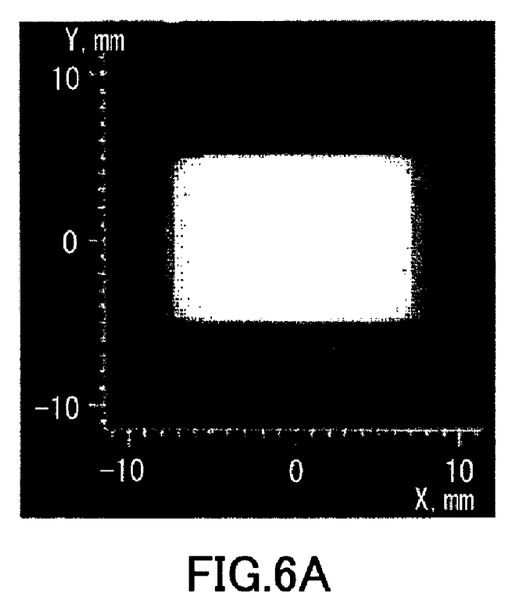
FIGS. 6A and 6B are diagrams showing the result of the experiment for testing the effect of the illumination optical system of Embodiment 1.
Figure 6B:
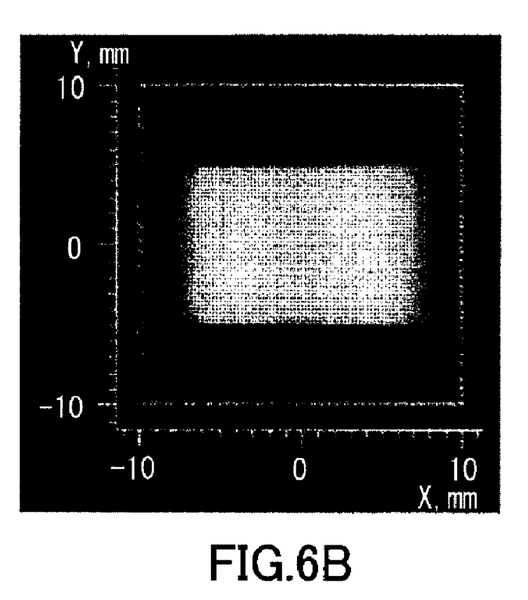

FIGS. 6A and 6B show design examples (examples of experiment). These design examples are examples in which the aperture forming edges of the luminous flux limiting unit 106 have the shape 106A shown in FIG. 4. FIGS. 6A and 6B show the light amount distribution of the illumination light introduced to the liquid crystal panel 2. The white area shows a bright area, and the black area shows a dark area in these figures. FIG. 6A shows a state in which the illumination light amount on the liquid crystal panel 2 is maximum, in other words the slit aperture of the luminous flux limiting unit 106 is fully opened, and FIG. 6B shows a state in which the slit-aperture width is set narrower to substantially halve the illumination light amount. Both FIGS. 6A and 6B show a good evenness of the light amount (light intensity). This proves that only the total light amount is changed by the change of the slit-aperture width.

Therefore, it is possible to design the luminous flux limiting unit 106 so as to obtain a certain desired illuminance distribution when bright displayed images are expected, and another certain desired illuminance distribution when dark displayed images are expected. Therefore, it becomes possible to set the illuminance distribution of the displayed images in consideration of the characteristics of a diffusion screen for image display and observer's sense of the evenness of brightness. For example, it is possible to set the illuminance distribution so that the central area of the displayed image may be brighter or darker than the peripheral area.

Although the first and second cylindrical lenses 105 and 108 have a refractive power only in the horizontal direction and the cylindrical condenser lens 107 has a refractive power only in the vertical direction, the present invention is not limited thereto. For example, at least one of the first and second cylindrical lenses 105 and 108 may be a toric lens having a refractive power also in the vertical direction to use the refractive power in place of the effect of the cylindrical condenser lens 107. This makes it possible to omit the cylindrical condenser lens 107.

Embodiment 2

Figure 7:
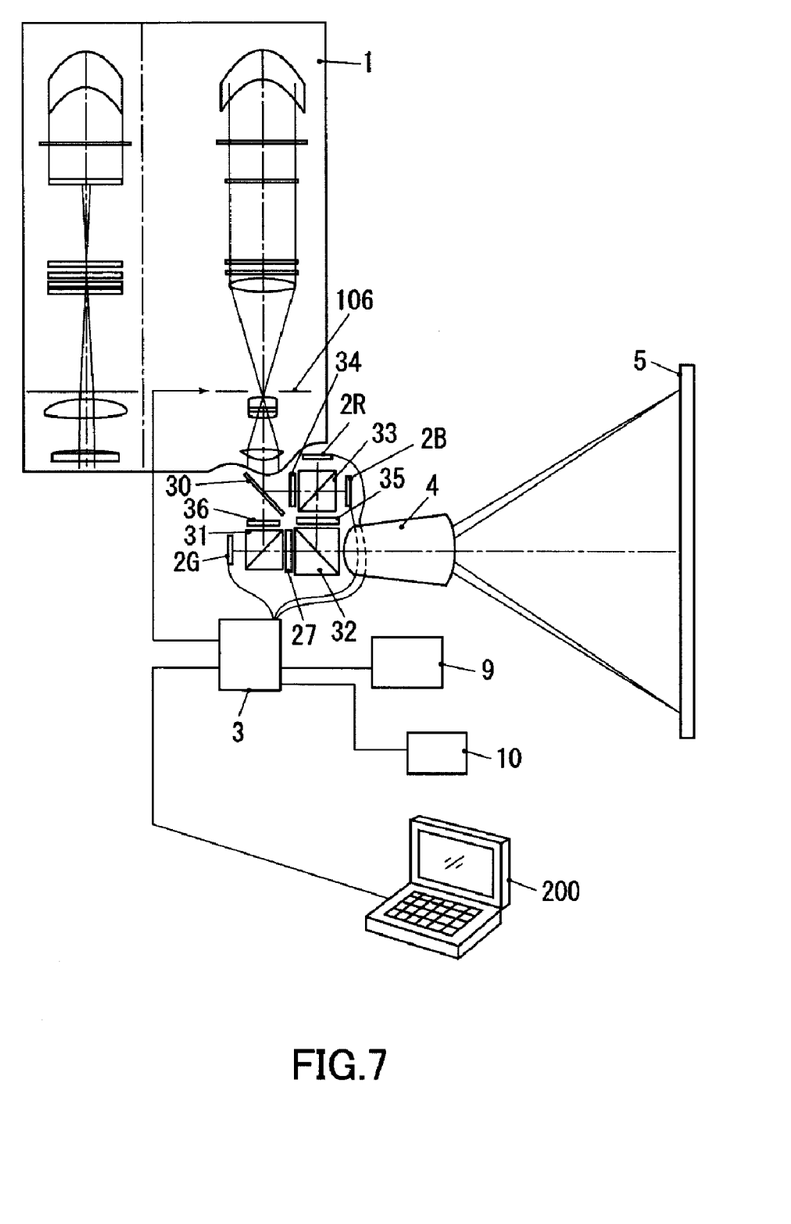
FIG. 7 is a sectional view showing the structure of an illumination optical system of a liquid crystal projector, which is Embodiment 2 of the present invention.

FIG. 7 shows an embodiment of a liquid crystal projector (image projection apparatus) using the illumination optical system 1 of Embodiment 1. FIG. 7 shows a cross-section of the entire optical system of the projector. In the rectangular line in this figure, the right side area of the dashed line shows the top view of the illumination optical system 1, and the left side area of the dashed line shows the side view thereof.

3 denotes a controller which controls the whole operation of the projector and includes a driver for driving liquid crystal panels 2R, 2G and 2B. The driver converts video input signals (or image signals) from an image supplying apparatus 200, such as a personal computer, DVD player and television tuner, into liquid crystal drive signals for each color, and outputs the drive signals to the liquid crystal panel 2R for red, the liquid crystal panel 2G for green and the liquid crystal panel 2B for blue. Thereby, an original image is formed on each liquid crystal panel. The liquid crystal panels 2R, 2G and 2B are reflective liquid crystal elements.

The magenta light component of the illumination light, which emerged from the illumination optical system 1 as linearly polarized light having a polarization direction perpendicular to the sheet of the figure, is reflected by a dichroic mirror 30 which reflects the magenta light component and transmits the green light component, and then enters a blue cross color polarizer 34. The blue cross color polarizer 34 provides a ½-wavelength retardation to the polarized light component of blue. The passage of the magenta light component through the blue cross color polarizer 34 produces the blue light component which is linearly polarized light polarizing in a direction parallel to the sheet of the figure and red light component which is linearly polarized light polarizing in the direction perpendicular to the sheet.

The blue light component enters a first polarization beam splitter 33 as P-polarized light, is transmitted through the polarization beam splitting film thereof, and then introduced to the liquid crystal panel 2B for blue. The red light component enters the first polarization beam splitter 33 as S-polarized light, is reflected by the polarization splitting film thereof, and then introduced to the liquid crystal panel 2R for red.

On the other hand, the green light component transmitted through the dichroic mirror 30 is transmitted through a dummy glass 36 for correcting an optical path length, and then enters a second polarization beam splitter 31 as S-polarized light. The green light component is reflected by the polarization beam splitting film of the second polarization beam splitter 31, and introduced to the liquid crystal panel 2G for green.

In this manner, the liquid crystal panels 2R, 2G, and 2B for red, green and blue are illuminated with the corresponding color light components. The color light component incident on each of the liquid crystal panel is modulated according to the original image formed thereon (in other words, a retardation of polarized light according to the modulation state of each pixel is given) and reflected.

Of the light modulated and reflected by each of the liquid crystal panel, a polarized light component polarizing in the same direction as the illumination light returns towards the lamp unit along an optical path approximately retracing the illumination optical path.

The red light component modulated by the liquid crystal panel 2R for red, which is polarized light polarizing in the direction parallel to the sheet of the figure, is transmitted through the polarization beam splitting film of the first polarization beam splitter 33, and then is transmitted through a red cross color polarizer 34, which gives a ½-wavelength retardation to the red polarized light. The red light component is converted into polarized light polarizing in the direction perpendicular to the sheet by the red cross color polarizer 34, and then enters a third polarization beam splitter 32 as S-polarized light.

The blue light component modulated by the liquid crystal panel 2B for blue, which is S-polarized light polarizing in the direction perpendicular to the sheet of the figure, is reflected by the polarization beam splitting film of the first polarization beam splitter 33. Next, the blue light component is transmitted through the red cross color polarizer 34 as it is, and then enters the third polarization beam splitter 32 as S-polarized light.

The green light component modulated by the liquid crystal panel 2G for green is transmitted through the polarization beam splitting film of the second polarization beam splitter 31 as P-polarized light. Next, the green light component is transmitted through a dummy glass 37 for correcting an optical path length, and then enters the third polarization beam splitter 32.

The red and blue light components as S-polarized light that entered the third polarization beam splitter 32 are reflected by the polarization beam splitting film thereof, and then proceed to a projection lens 4. The green light component as P-polarized light is transmitted through the polarization beam splitting film of the third polarization beam splitter 32, and then proceeds to the projection lens 4.

The modulation light thus color-combined is captured by the entrance pupil of the projection lens 4, and transferred to a light diffusion screen 5. Thereby, an image according to the video input signal (original image) is displayed on the light diffusion screen 5.

The projection lens 4A provides an optical conjugation relationship between the modulation plane of each of the liquid crystal panels and the light diffusion screen 5. The three liquid crystal panels are adjusted mechanically or electrically so that images of the corresponding pixels may overlap with each other on the light diffusion screen 5 with a predetermined accuracy.

In the projector configured as above, the luminous flux limiting unit 106 provided in the illumination apparatus 1 is driven by an actuator such as a motor or an electromagnetic solenoid, not shown, which is provided in the unit 106. The luminous flux limiting unit 106 is driven so that the slit-aperture width is changed non-stepwisely or stepwisely.

The controller 3 controls the actuator. The projector has a controlling mode for the slit-aperture width, in which the slit-aperture width is controlled based on signals that are output from an operation panel 9 according to operations of a user. The projector has another controlling mode for the slit-aperture width, in which the slit-aperture width is controlled based on output signals from an illuminance sensor 10 that detects the external brightness. In this mode, the slit-aperture width is controlled so as to be narrower when the external brightness is high than when the external brightness is low.

Further, another controlling mode for the slit-aperture width can be provided, in which a brightness signal level of a pre-displayed image scene is detected from an input image signal stored in a buffer memory, not shown, and the slit-aperture width is controlled based on the detected brightness signal level. In this mode, the slit-aperture width is controlled so as to be narrower when the brightness signal level is high than when the brightness signal level is low.

These automatic controls of the slit-aperture width make it possible to automatically adjust the brightness of displayed images depending on the intention of the user, displaying situations, or types of images.

As described above, in these embodiments, the luminous flux limiting unit 106, which limits the width of the luminous flux only in the horizontal direction that is the second axis direction, is placed at the common focal line position of the first and second cylindrical lenses 105 and 108 or the vicinity thereof between these lenses 105 and 108, and the slit-aperture width of the luminous flux limiting unit 106 is changeable. Therefore, a projector can be achieved, in which it is possible to set the brightness of displayed images optionally, and to improve the contrast ratio without deteriorating the evenness of brightness of the displayed image even if the brightness of the displayed image is reduced.

In other words, in these embodiments, only the aperture size in the second axis direction can be changed by the luminous flux limiting unit 106. Therefore, it is possible to set the brightness of the displayed images optionally without deteriorating the evenness of brightness of the displayed image and reducing the contrast ratio thereof. Especially, even when the brightness of the displayed image is suppressed, it is possible to improve the contrast ratio without deteriorating the evenness of brightness of the displayed image.

Although the description was made of a so-called front projection type projector in the above-described embodiments, the present invention can be applied to a so-called rear projection type projector.

Furthermore, although the description was made of a case where a liquid crystal panel was used as an image-forming element, the present invention can be applied to cases where other image-forming elements are used.

Moreover, although the description was made of a case where the luminous flux limiting unit 106 was provided in the illumination optical system, a luminous flux limiting unit with a configuration similar to that of the luminous flux limiting unit 106 can be provided not in the illumination optical system but in a projection lens that projects an original image formed on the image-forming element onto a screen.

This application claims a foreign priority benefit based on Japanese Patent Applications No. 2005-068895, filed on Mar. 11, 2005, which is hereby incorporated by reference herein in its entirety as if fully set forth herein.

What is claimed is:

1. An optical system which introduces an illumination luminous flux from a light source to an image-forming element and projects an luminous flux from the image-forming element onto a projection surface, the optical system comprising:
   an optical integrator which divides and recombines the illumination luminous flux in a first axis direction in a two-dimensional section that is orthogonal to a travelling direction of the illumination luminous flux;
   a light intensity distribution converter which has a function to convert the light intensity distribution of the illumination luminous flux in a second axis direction, which is orthogonal to the first axis direction, in the two-dimensional section; and
   a luminous flux limiting unit which has an aperture, the size of the aperture being changeable in the second axis direction and unchangeable in the first axis direction.

2. The optical system according to claim 1, wherein the aperture forming edges of the luminous flux limiting unit have a non-parallel shape.

3. The optical system according to claim 1, wherein the aperture forming edges of the luminous flux limiting unit have a curved shape.

4. The optical system according to claim 1, wherein the light intensity distribution converter is constituted by two positive lens units and has a function to convert a luminous flux width.

5. The optical system according to claim 4, wherein the luminous flux limiting unit is provided between the two positive lens units.

6. An optical system which introduces an illumination luminous flux from a light source to an image-forming element, the optical system comprising:
   an optical integrator which divides and recombines the illumination luminous flux in a first axis direction in a two-dimensional section that is orthogonal to a travelling direction of the illumination luminous flux;
   a light intensity distribution converter which has a function to convert the light intensity distribution of the illumination luminous flux in a second axis direction, which is orthogonal to the first axis direction, in the two-dimensional section; and
   a luminous flux limiting unit which has an aperture, the size of the aperture being changeable in the second axis direction and unchangeable in the first axis direction.

7. The optical system according to claim 6, wherein the aperture forming edges of the luminous flux limiting unit have a non-parallel shape.

8. The optical system according to claim 6, wherein the aperture forming edges of the luminous flux limiting unit have a curved shape.

9. The optical system according to claim 6, wherein the light intensity distribution converter is constituted by two positive lens units and has a function to convert a luminous flux width.

10. The optical system according to claim 9, wherein the luminous flux limiting unit is provided between the two positive lens units.

11. An optical system which introduces an illumination luminous flux from a light source to an image-forming element and projects an luminous flux from the image-forming element onto a projection surface, the optical system comprising:
    an optical integrator which divides and recombines the illumination luminous flux in a first axis direction in a two-dimensional section that is orthogonal to a travelling direction of the illumination luminous flux;
    a light intensity distribution converter which has at least a function to convert the light intensity distribution of the illumination luminous flux in a second axis direction, which is orthogonal to the first axis direction, in the two-dimensional section; and
    a luminous flux limiting unit which has an aperture,
    wherein the luminous flux limiting unit has a part where the width of the aperture in the second axis direction becomes larger as the distance from an optical axis of the optical system increases in the first axis direction.

12. The optical system according to claim 11, wherein the aperture forming edges of the luminous flux limiting unit have a non-parallel shape.

13. The optical system according to claim 11, wherein the aperture forming edges of the luminous flux limiting unit have a curved shape.

14. The optical system according to claim 11, wherein the light intensity distribution converter is constituted by two positive lens units and has a function to convert a luminous flux width.

15. The optical system according to claim 14, wherein the luminous flux limiting unit is provided between the two positive lens units.

16. An image projection apparatus comprising:
    an image-forming element; and
    the optical system according to claim 1.

17. The image projection apparatus according to claim 16, further comprising a controller which controls the operation of the luminous flux limiting unit based on at least one of an operation signal from an operating member, type of an input image signal and brightness scene information on an input image.

18. The image projection apparatus according to claim 16, further comprising:
   a detector which detects external brightness; and
   a controller which controls the operation of the luminous flux limiting unit based on the detection result of the detector.

19. An image projection apparatus comprising:
   an image-forming element; and
   the optical system according to claim 6.

20. The image projection apparatus according to claim 19, further comprising a controller which controls the operation of the luminous flux limiting unit based on at least one of an operation signal from an operating member, type of an input image signal and brightness scene information on an input image.

21. The image projection apparatus according to claim 19, further comprising:
   a detector which detects external brightness; and
   a controller which controls the operation of the luminous flux limiting unit based on the detection result of the detector.

22. An image projection apparatus comprising:
   an image-forming element; and
   the optical system according to claim 11.

23. The image projection apparatus according to claim 22, further comprising a controller which controls the operation of the luminous flux limiting unit based on at least one of an operation signal from an operating member, type of an input image signal and brightness scene information on an input image.

24. The image projection apparatus according to claim 22, further comprising:
   a detector which detects external brightness; and
   a controller which controls the operation of the luminous flux limiting unit based on the detection result of the detector.

25. An image display system comprising:
   the image projection apparatus according to claim 16; and
   an image supplying apparatus which supplies an image signal to the image projection apparatus.

26. An image display system comprising:
   the image projection apparatus according to claim 19; and
   an image supplying apparatus which supplies an image signal to the image projection apparatus.

27. An image display system comprising:
   the image projection apparatus according to claim 22; and
   an image supplying apparatus which supplies an image signal to the image projection apparatus.

* * * * *